(12) United States Patent
Gupta et al.

(10) Patent No.: US 11,239,520 B2
(45) Date of Patent: Feb. 1, 2022

(54) ASSEMBLIES FOR SUPPORTING BATTERY ARRAYS AND OTHER COMPONENTS WITHIN BATTERY PACKS

(71) Applicant: FORD GLOBAL TECHNOLOGIES, LLC, Dearborn, MI (US)

(72) Inventors: Rohan Gupta, Livonia, MI (US); Eid Farha, Ypsilanti, MI (US); Michael William Danyo, Trenton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 107 days.

(21) Appl. No.: 16/386,619

(22) Filed: Apr. 17, 2019

(65) Prior Publication Data

US 2020/0335743 A1 Oct. 22, 2020

(51) Int. Cl.
*H01M 50/20* (2021.01)

(52) U.S. Cl.
CPC ........ *H01M 50/20* (2021.01); *H01M 2220/20* (2013.01)

(58) Field of Classification Search
CPC . H01M 2/1077; H01M 2220/20; Y02T 10/70; Y02E 60/10
USPC ........................................................ 429/156
See application file for complete search history.

(56) References Cited

U.S. PATENT DOCUMENTS

| | | | |
|---|---|---|---|
| 5,501,289 A * | 3/1996 | Nishikawa ............ | H01M 50/20 180/68.5 |
| 9,321,337 B2 | 4/2016 | Wang et al. | |
| 9,636,984 B1 | 5/2017 | Baccouche et al. | |
| 10,003,052 B2 | 6/2018 | Paramasivam et al. | |
| 2008/0124622 A1 | 5/2008 | Hamada et al. | |
| 2009/0297892 A1 | 12/2009 | Ijaz et al. | |
| 2012/0175320 A1 | 7/2012 | Paramasivam et al. | |
| 2013/0164577 A1 | 6/2013 | Insana et al. | |
| 2015/0174995 A1 * | 6/2015 | Wang ..................... | B60L 50/66 180/68.5 |
| 2015/0280183 A1 * | 10/2015 | Utley .................... | H01M 50/20 429/99 |
| 2016/0197373 A1 * | 7/2016 | Shaffer, II ............ | H01M 50/60 429/210 |
| 2017/0305249 A1 * | 10/2017 | Hara ..................... | H01M 50/20 |

* cited by examiner

*Primary Examiner* — Christian Roldan
(74) *Attorney, Agent, or Firm* — David B. Kelley; Carlson, Gaskey & Olds

(57) ABSTRACT

This disclosure details assemblies for mounting and supporting components within battery packs. Exemplary battery packs may include a first battery array, a second battery array positioned adjacent to the first battery array, a crossmember positioned between the first battery array and the second battery array, and a support bracket connected to the crossmember. Together, the crossmember and the support bracket established an assembly. Both the first battery array and the second battery array may be secured to the crossmember, and the support bracket may support a second tier structure above at least one of the first battery array or the second battery array.

17 Claims, 6 Drawing Sheets

Section A-A

Section B-B

ASSEMBLIES FOR SUPPORTING BATTERY ARRAYS AND OTHER COMPONENTS WITHIN BATTERY PACKS

TECHNICAL FIELD

This disclosure relates to battery packs, and more particularly to assemblies for mounting and supporting battery arrays and other components inside of battery packs.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. An enclosure assembly of the battery pack houses a plurality of battery internal components including, but not limited to, battery arrays and battery electronic components. The battery internal components typically must be retained from movement inside the enclosure assembly.

SUMMARY

A battery pack according to an exemplary aspect of the present disclosure includes, among other things, a first battery array, a second battery array adjacent the first battery array, a crossmember positioned between the first battery array and the second battery array, and a support bracket connected to the crossmember. Both the first battery array and the second battery array are secured to the crossmember.

In a further non-limiting embodiment of the foregoing battery pack, a first flange of a first sidewall of the first battery array is secured to the crossmember by a first mechanical fastener, and a second flange of a second sidewall of the second battery array is secured to the crossmember by a second mechanical fastener.

In a further no-limiting embodiment of either of the foregoing battery packs, the first mechanical fastener and the second mechanical fastener are received through through-holes of an upper platform of the crossmember.

In a further non-limiting embodiment of any of the foregoing battery packs, the support bracket includes an anchoring arm that is received through a through-hole of an upper platform of the crossmember.

In a further non-limiting embodiment of any of the foregoing battery packs, the anchoring arm is welded to a stanchion of the crossmember.

In a further non-limiting embodiment of any of the foregoing battery packs, the support bracket supports a second tier structure above the first battery array or the second battery array. The second tier structure is secured to the support bracket by a mechanical fastener.

In a further non-limiting embodiment of any of the foregoing battery packs, the mechanical fastener is received within a hole formed in a platform of the support bracket.

In a further non-limiting embodiment of any of the foregoing battery packs, the crossmember includes a base, a stanchion that extends upwardly from the base, and an upper platform disposed at an opposite end of the stanchion from the base.

In a further non-limiting embodiment of any of the foregoing battery packs, a first base portion of the base is attached to a first section of a tray of an enclosure assembly of the battery pack, and a second base portion of the base is attached to a second section of the tray.

In a further non-limiting embodiment of any of the foregoing battery packs, a hollow section is formed in the base and the stanchion.

In a further non-limiting embodiment of any of the foregoing battery packs, the stanchion includes a first stanchion portion having a first thickness and a second stanchion portion having a second thickness that is smaller than the first thickness.

In a further non-limiting embodiment of any of the foregoing battery packs, the upper platform includes a third thickness that is greater than the first thickness.

In a further non-limiting embodiment of any of the foregoing battery packs, the upper platform includes a first platform portion that extends in a first direction laterally away from the stanchion and a second platform portion that extends in a second, opposite direction laterally away from the stanchion.

In a further non-limiting embodiment of any of the foregoing battery packs, the crossmember and the support bracket form an assembly, and the assembly further includes an isolator mount attached to the crossmember.

In a further non-limiting embodiment of any of the foregoing battery packs, the isolator mount includes an elastomeric bushing.

A method according to another exemplary aspect of the present disclosure includes, among other things, attaching a support bracket to a crossmember to establish an assembly, mounting the assembly to a tray of a battery pack, mounting a first battery array to the crossmember, and supporting a second tier structure of the battery pack relative to the first battery array with the support bracket.

In a further non-limiting embodiment of the foregoing method, attaching the support bracket to the crossmember includes inserting an anchoring arm of the support bracket through an upper platform of the crossmember, and welding the anchoring arm to a stanchion of the crossmember.

In a further non-limiting embodiment of either of the foregoing methods, mounting the assembly to the tray includes welding a base of the crossmember to the tray.

In a further non-limiting embodiment of any of the foregoing methods, mounting the first battery array includes mechanically attaching the first battery array to an upper platform of the crossmember with at least one mechanical fastener.

In a further non-limiting embodiment of any of the foregoing methods, supporting the second tier structure includes attaching the second tier structure to a platform of the support bracket with at least one mechanical fastener.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the

DETAILED DESCRIPTION

This disclosure details assemblies for mounting and supporting components within battery packs. Exemplary battery packs may include a first battery array, a second battery array positioned adjacent to the first battery array, a crossmember positioned between the first battery array and the second battery array, and a support bracket connected to the crossmember. Together, the crossmember and the support bracket established an assembly. Both the first battery array and the second battery array may be secured to the crossmember, and the support bracket may support a second tier structure above at least one of the first battery array or the second battery array. These and other features are discussed in greater detail in the following paragraphs of this detailed description.

Figure 1:
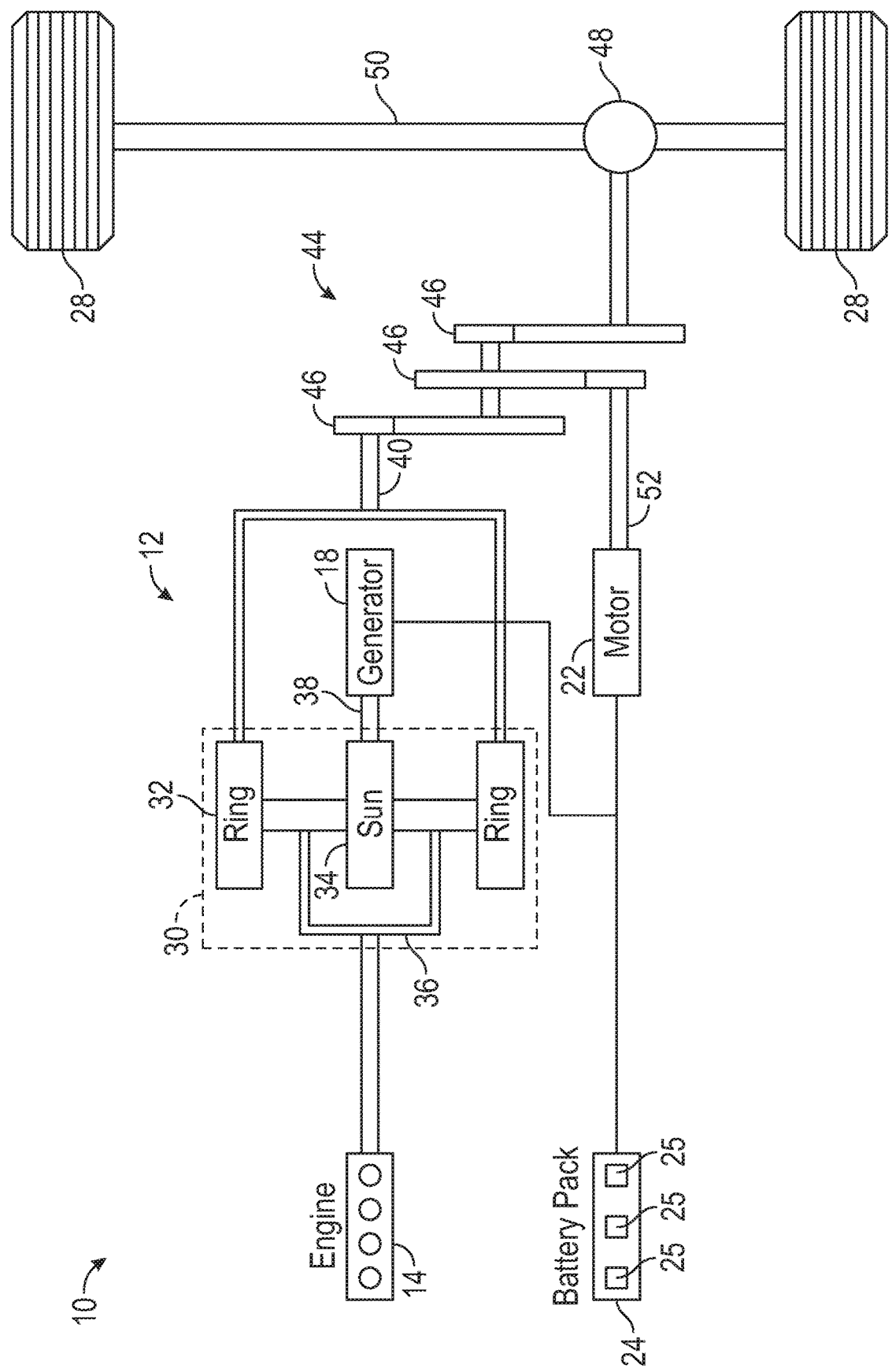
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
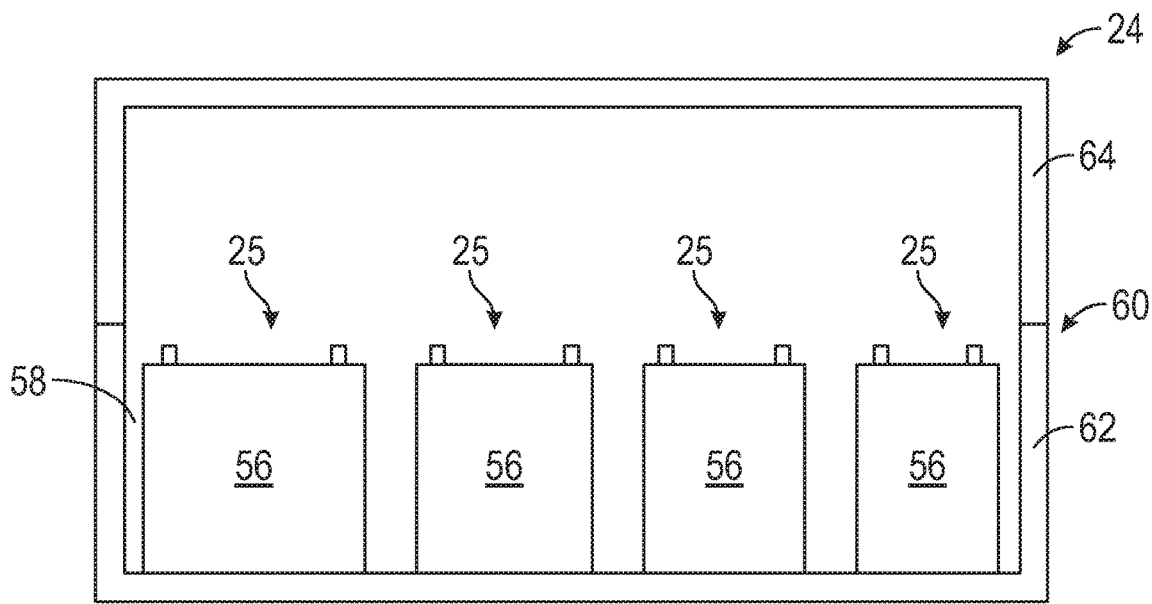
FIG. 2 illustrates a battery pack of an electrified vehicle.
Figure 3:
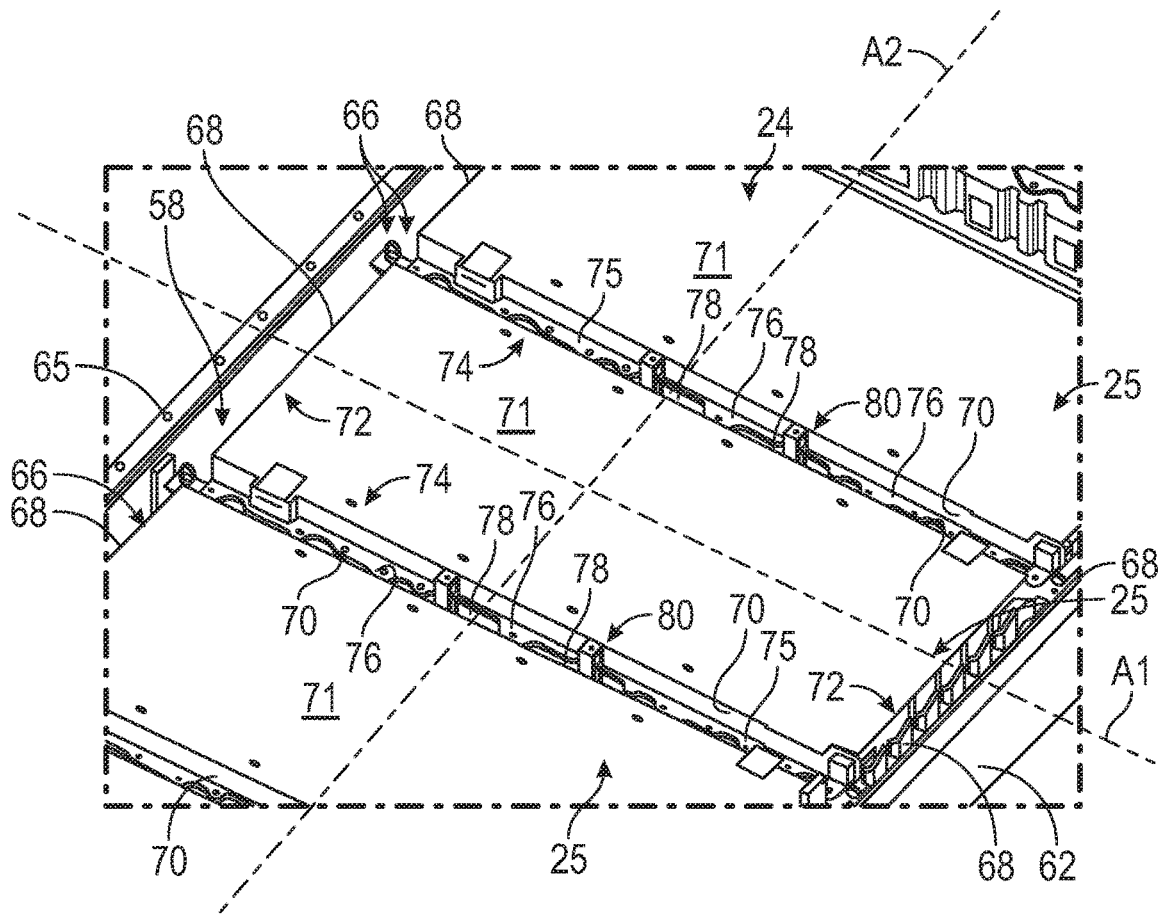
FIG. 3 illustrates select portions of the battery pack of FIG. 2.

FIGS. 2 and 3 illustrate a battery pack 24 that can be employed within an electrified vehicle, such as the electrified vehicle 12 of FIG. 1 or any other electrified vehicle. FIG. 2 is a highly schematic, cross-sectional view of the battery pack 24, and FIG. 3 is a top, perspective view of the battery pack 24. Portions (e.g., a cover 64) of the battery pack 24 are removed in FIG. 3 for better visualizing the internal contents of the battery pack 24.

The battery pack 24 may house a plurality of battery cells 56 that store energy for powering various electrical loads of the electrified vehicle 12. The battery pack 24 could employ any number of battery cells 56 within the scope of this disclosure. Accordingly, this disclosure is not limited to the exact configuration shown in FIGS. 2 and 3.

The battery cells 56 may be stacked side-by-side to one another along one or more stack axes to construct groupings of battery cells 56, sometimes referred to as "cell stacks" or "cell arrays." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56 of each cell stack grouping, along with any support structures (e.g., array frames, spacers, rails, walls, plates, bindings, etc.), may collectively be referred to as a battery assembly or a battery array 25. The battery pack 24 depicted in FIG. 2 includes four battery arrays 25 that are positioned laterally adjacent to one another. However, the battery pack 24 could include a greater or fewer number of battery arrays and still fall within the scope of this disclosure. Although not shown in FIG. 2 or FIG. 3 for the sake of simplicity, additional components, such as additional battery arrays, could be packaged over top of the battery arrays 25 in a second tier/row of the battery pack 24, as is further discussed below.

An enclosure assembly 60 may house each battery array 25 of the battery pack 24. The enclosure assembly 60 may include any size, shape, and configuration within the scope of this disclosure. In an embodiment, the enclosure assembly 60 is a sealed enclosure that includes a tray 62 and a cover 64. For example, during assembly, the battery arrays 25 may be positioned within one or more pockets 58 formed in the tray 62, and the cover 64 may then be fixedly secured to a peripheral flange 65 of the tray 62 to seal the battery arrays 25 therein. The cover 64 is removed in FIG. 3 to better illustrate an exemplary positioning of the battery arrays 25 relative to the tray 62.

Figure 4:
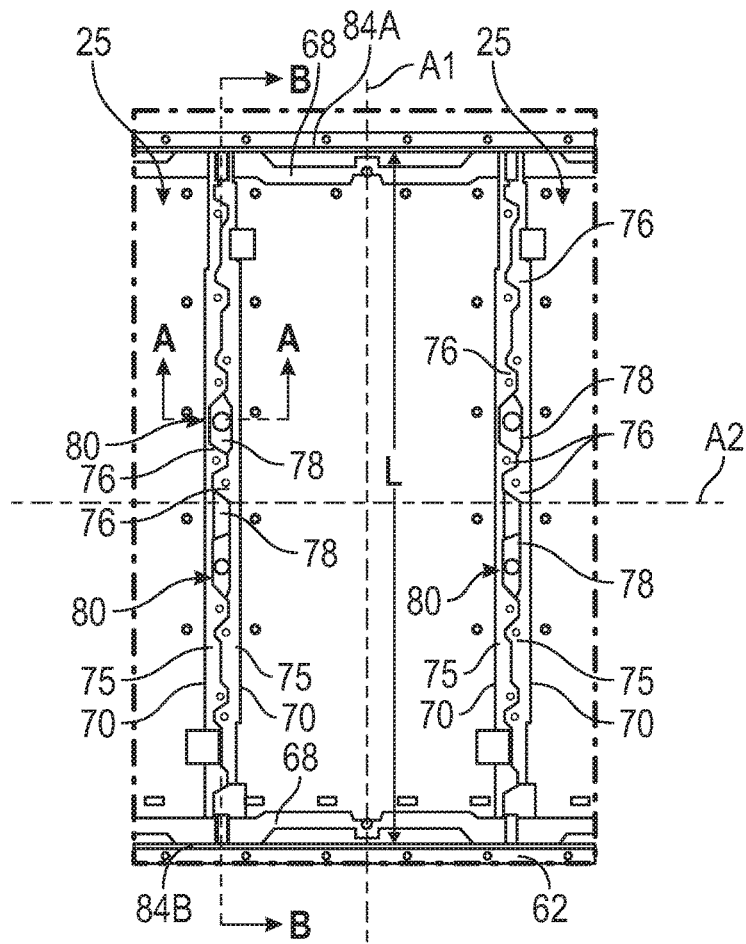
FIG. 4 is a top view illustrating select portions of the battery pack of FIG. 3.
Figure 5:
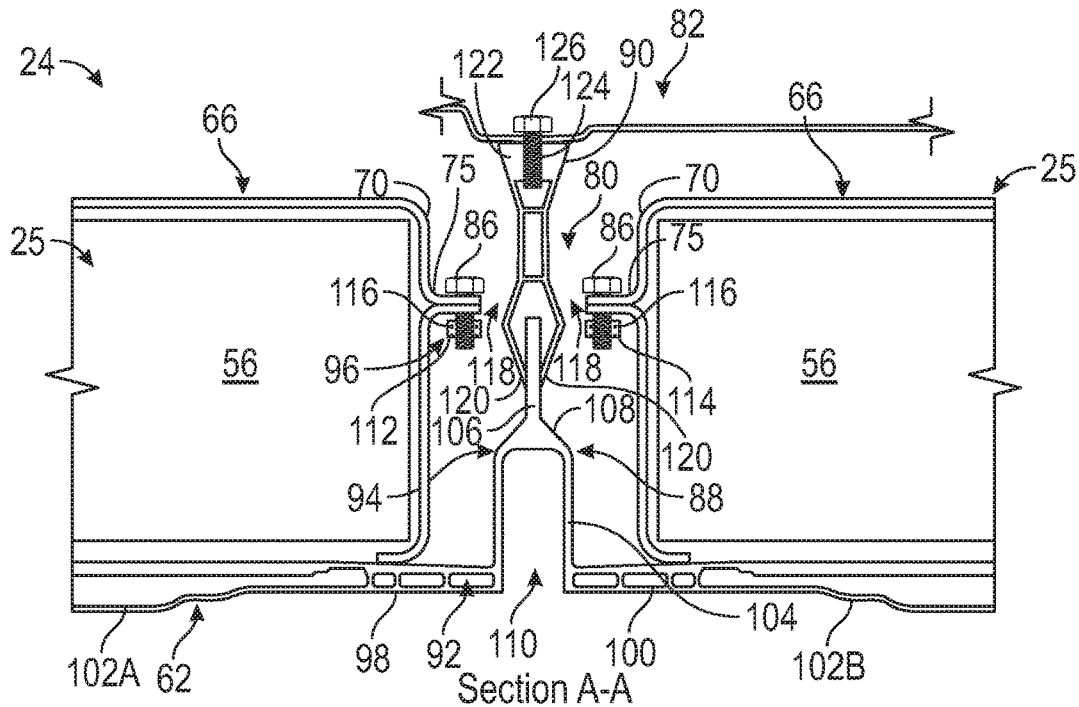
FIG. 5 is a cross-sectional view through section A-A of FIG. 4.

Referring now to FIGS. 3, 4, and 5, each battery array 25 may include a support structure 66 that is disposed around an outer perimeter of each cell stack. In an embodiment, the support structure 66 includes pairs of end plates 68, a pair of side plates 70, and a top plate 71. The end plates 68, the side plates 70, and the top plate 71 cooperate to axially constrain the battery cells 56 in the stacked configuration.

One of the end plates 68 may be disposed at each longitudinal extent 72 of the battery arrays 25, and one of the side plates 70 connects between the end plates 68 on each side 74 of the battery arrays 25. In an embodiment, the end plates 68 extend within a plane that is transverse to a longitudinal axis A1 of the battery arrays 25, and the side plates 70 extend in a plane that is parallel with the longitudinal axis A1. In another embodiment, the longitudinal axes A1 of the battery arrays 25 extend transversely relative to a longitudinal axis A2 of the tray 62. However, other configurations are also contemplated, and this disclosure is not limited to the specific battery array placements and configurations shown in FIGS. 3, 4, and 5.

Each side plate 70 of the support structure 66 may include a flange 75 that protrudes laterally away from a body of the side plate 70 in a direction toward the side plate 70 of a neighboring battery array 25. Each flange 75 may include one or more tabs 76. The tabs 76 may or may not overlap the tabs 76 of a flange 75 of a neighboring battery array 25. One or more voids 78 (e.g., open spaces) may extend between the flanges 75 of the side plates 70 of adjacent battery arrays 25. The voids 78 are configured for accommodating portions of assemblies that may be utilized for mounting and supporting the battery arrays 25 and other components inside the battery pack 24.

For example, an assembly 80 may be positioned between adjacent battery arrays 25 of the battery pack 24. The assemblies 80 may be employed for mounting and supporting the battery arrays 25 relative to the tray 62 and for supporting second tier structures 82 (best shown in FIG. 5) within the battery pack 24. The total number of assemblies 80 employed within the battery pack 24 is design specific and is therefore not intended to limit this disclosure.

In an embodiment, each assembly 80 extends along an axis that is parallel to the longitudinal axes A1 of the battery arrays 25 and is disposed axially between adjacent battery arrays 25 of the battery pack 24. The assemblies 80 may each extend across a length L (best shown in FIG. 4) that spans from a side wall 84A to an opposing side wall 84B of the tray 62. In another embodiment, the assemblies 80 are separate components the support structure 66 of the battery arrays 25.

Each assembly 80 may be secured to both the support structures 66 of adjacent battery arrays 25 and to a portion (e.g., the tray 62) of the enclosure assembly 60. In an embodiment, the flanges 75 of the side plates 70 of the battery arrays 25 are secured to the assemblies 80 via one or more mechanical fasteners 86 (e.g., bolts, screws, etc.). In another embodiment, the assemblies 80 are secured (e.g., welded) to sections of the tray 62 such that each assembly 80 effectively functions as part of the tray 62 of the enclosure assembly 60. Other mounting locations and configurations of the assemblies 80 could also be suitable and are therefore contemplated within the scope of this disclosure.

Figure 6:
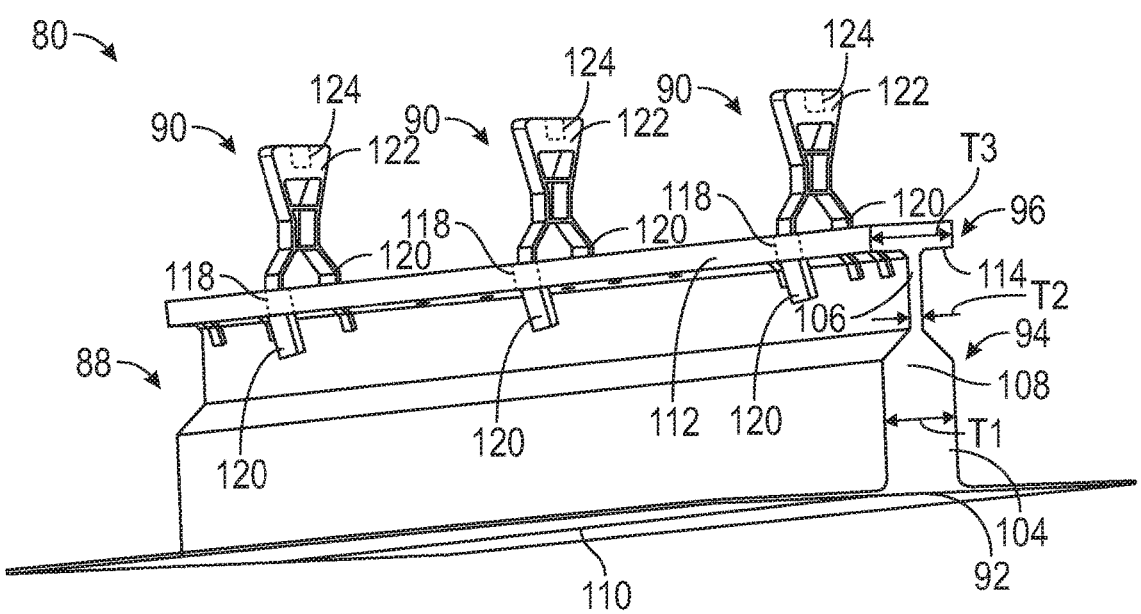
FIG. 6 is a perspective view of an assembly for mounting and supporting battery arrays and other components within a battery pack.

FIGS. 5 and 6, with continued reference to FIGS. 2-4, illustrate an exemplary design of the assembly 80. Although a specific design of the assembly 80 is illustrated in these figures, the assembly 80 could incorporate various modifications and still fall within the scope of this disclosure so long as the assembly 80 is capable of mounting and supporting both the battery arrays 25 and the second tier structures 82 within the battery pack 24.

In an embodiment, the assembly 80 includes a crossmember 88 and one or more support brackets 90 that may be attached to the crossmember 88. The crossmember 88 may include a base 92, a stanchion 94 that extends upwardly from the base 92, and an upper platform 96 disposed at an opposite end of the stanchion 94 from the base 92. The crossmember 88 may be a single piece, monolithic part that includes each of the base 92, the stanchion 94, and the upper platform 96.

The base 92 of the crossmember 88 may be relatively flat and is configured, in an embodiment, to be attached to the tray 62 of the enclosure assembly 60 of the battery pack 24. In an embodiment, the base 92 includes a first base portion 98 that extends in a first direction laterally away from the stanchion 94 and a second base portion 100 that extends in a second, opposite direction laterally away from the stanchion 94. The first base portion 98 may be attached (e.g., welded) to a first section 102A of the tray 62, and the second base portion 100 may be attached (e.g., welded) to a second section 102B of the tray 62. Once attached, the base 92 of the crossmember 88 functions as part of the tray 62 for supporting the battery arrays 25.

The stanchion 94 of the crossmember 88 may include a first stanchion portion 104 that is attached to the base 92 and a second stanchion portion 106 that is attached to the upper platform 96. The first stanchion portion 104 may include a first thickness T1 and the second stanchion portion 106 may include a second thickness T2 that is smaller than the first thickness T1. In an embodiment, a tapered section 108 of the first stanchion portion 104 tapers between the first thickness T1 and the second thickness T2.

The crossmember 88 may include one or more hollow sections 110 for reducing the overall weight of the assembly 80. In an embodiment, the hollow section 110 may extend through portions of both the base 92 and the first stanchion portion 104 of the crossmember 88.

The upper platform 96 of the crossmember 88 may be relatively flat and is configured, in an embodiment, to receive the support brackets 90 and for providing an attachment point for attaching to the neighboring battery arrays 25. In an embodiment, the upper platform 96 includes a first platform portion 112 that extends in a first direction laterally away from the second stanchion portion 106 and a second platform portion 114 that extends in a second, opposite direction laterally away from the second stanchion portion 106. The upper platform 96 may include a third thickness T3 that is larger than the first and second thicknesses T1, T2.

The upper platform 96 may include first through-holes 116 that are each configured for receiving one of the mechanical fasteners 86 for mechanically securing the flanges 75 of the side plates 70 of adjacent battery arrays 25 to each of the first platform portion 112 and the second platform portion 114. The first through-holes 116 therefore establish attachment points for securing the battery arrays 25 to the crossmember 88. The upper platform 96 may additionally include second through-holes 118 that are configured for receiving the support brackets 90. The second through-holes 118 therefore establish attachment points for securing the support brackets 90 to the crossmember 88. In an embodiment, the second through-holes 118 are disposed inboard of the first through-holes 116. The total number and placement of the first and second through-holes 116, 118 provided on the upper platform 96 is design dependent and therefore not intended to limit this disclosure.

The support brackets 90 of the assembly 80 may include a pair of anchoring arms 120 and a platform 122. The anchoring arms 120 may be positioned through the second through-holes 118 of the upper platform 96 for securing the support brackets 90 to the crossmember 88. In an embodiment, the anchoring arms 120 are welded to the second stanchion portion 106 of the crossmember 88.

The platform 122 may include a hole 124 for accommodating a mechanical fastener 126. The second tier structure 82 may be secured relative to the support bracket 90 by inserting the mechanical fastener 126 through the second tier structure 82 and then into the hole 124 of the platform 122 of the support bracket 90. In this way, in addition to mounting the battery arrays 25, the assembly 80 may additionally support one or more second tier structures 82 within the battery pack 24. The second tier structures 82 could include additional battery arrays, electronics, control modules, wiring, etc. Once secured, the second tier structures 82 would make up a second tier or second row of the battery pack 24.

The crossmember 88 and the support brackets 90 may be constructed out of a metallic material. In an embodiment, the crossmember 88 and the support brackets 90 are extruded parts made of an aluminum alloy. However, other manufacturing techniques and other materials or combinations of materials may be utilized to manufacture the crossmember 88 and the support brackets 90 of the assembly 80.

Figure 7:
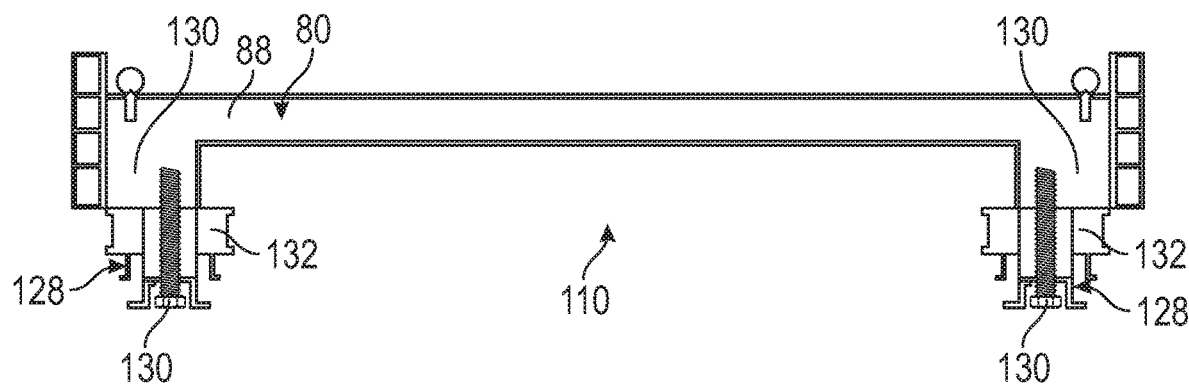
FIG. 7 is a cross-sectional view through section B-B of FIG. 4.
Figure 8:
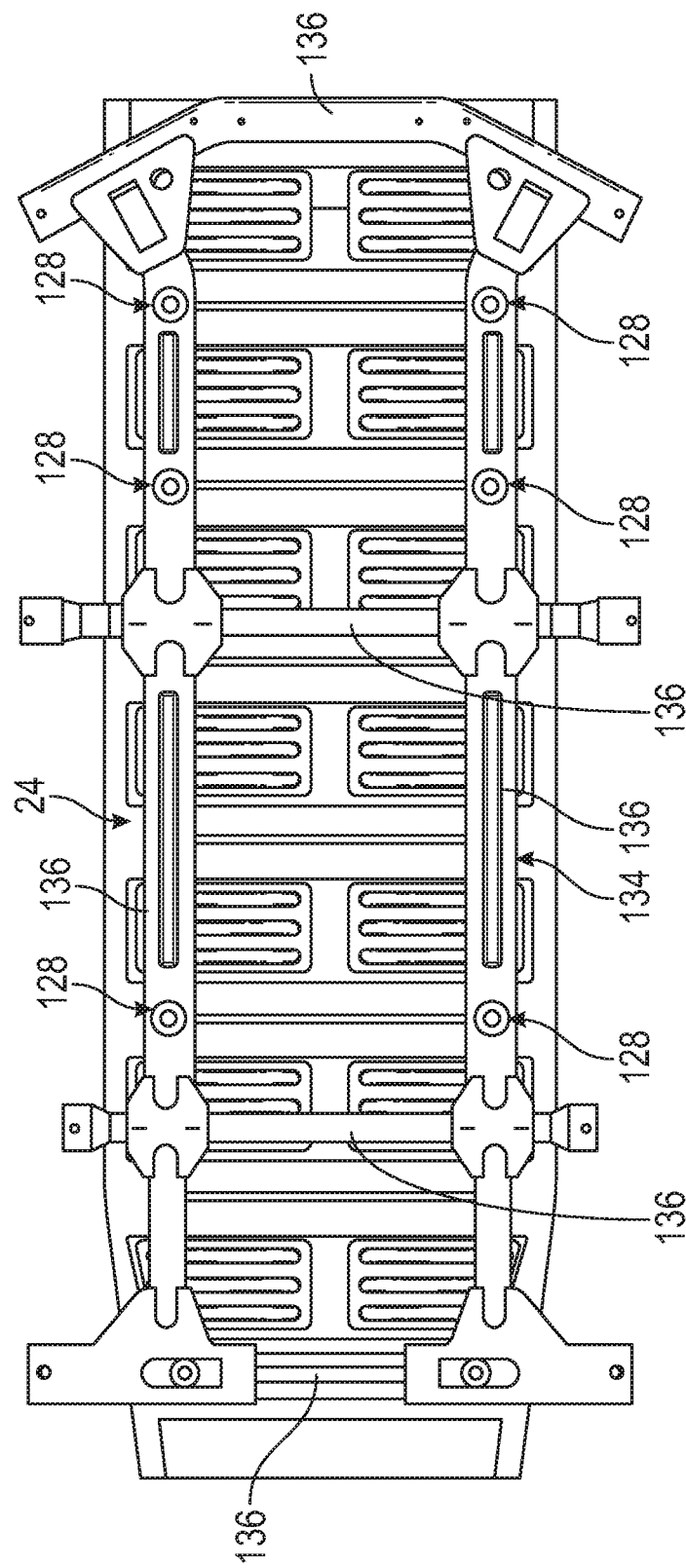
FIG. 8 is a bottom view of the battery pack of FIGS. 2-5 and 7.

Referring now to FIGS. 7-8, each assembly 80 may additionally include one or more isolator mounts 128. In an embodiment, one isolator mount 128 is mounted at each opposing end portion 130 of the crossmember 88. The isolator mounts 128 may include elastomeric bushings 132 and may be mounted to the crossmember 88 with mechanical fasteners 130.

The isolator mounts 128 may be utilized to mount the battery pack 24 to a ladder structure 134. The ladder structure 134 may include a plurality of beams 136 for mounting the battery pack 24 relative to a vehicle frame (not shown). The elastomeric bushings 132 of the isolator mounts 128 are configured to substantially isolate the battery pack 24 from vehicle loads (e.g., impact loads, durability loads, and noise, vibration, and harshness (NVH) loads) that may be imparted onto the vehicle frame, thereby preventing such loads from being transferred into the battery pack 24.

Figure 9:
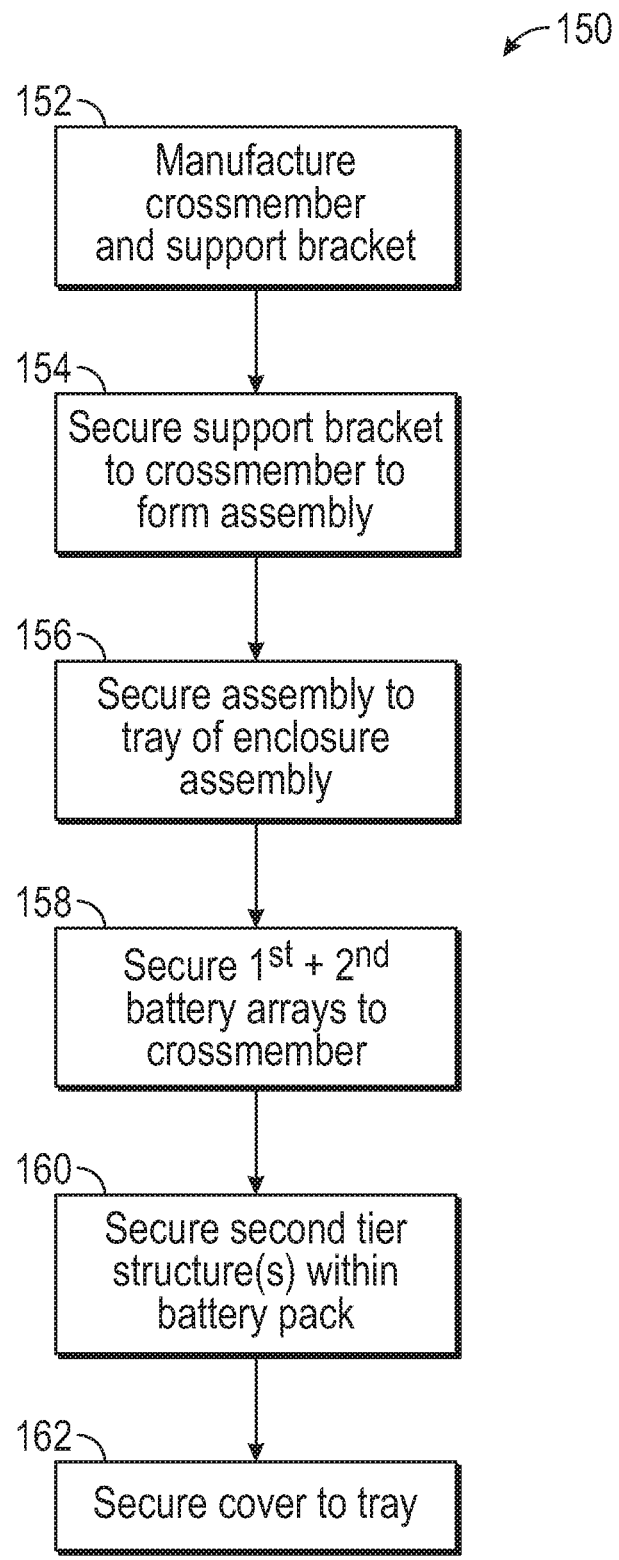
FIG. 9 schematically illustrates an exemplary method for assembling a battery pack.

FIG. 9, with continued reference to FIGS. 2-8, schematically illustrates a method 150 for assembling the battery pack 24 described above. First, at block 152, the crossmember 88 and the support bracket 90 may be manufactured from a metallic material. In an embodiment, the crossmember 88 and the support bracket 90 are extruded out of an aluminum alloy.

Next, at block 154, the support bracket 90 may be secured to the crossmember 88 to form the assembly 80. In an embodiment, the support bracket 90 is welded to the crossmember 88 from a location underneath the upper platform 96 of the crossmember 88. In another embodiment, the anchoring arms 120 of the support bracket 90 are welded to the second stanchion portion 106 of the crossmember 88.

The assembly 80 may be secured to the tray 62 of the enclosure assembly 60 at block 156. In an embodiment, the first base portion 98 of the crossmember 88 is welded to the first section 102A of the tray 62, and the second base portion 100 of the crossmember 88 is welded to the second section 102B of the tray 62.

Next, at block 158, first and second battery arrays 25 may be secured to the crossmember 88 of the assembly 80. In an embodiment, mechanical fasteners 86 may be inserted through the flanges 75 of the side plates 70 of the first and second battery arrays 25 and then into the first through-holes 116 of the first platform portion 112 and the second platform portion 114 of the upper platform 96 of the crossmember 88 in order to secure the first and second battery arrays 25 to the crossmember 88 of the assembly 80.

One or more of the second tier structures 82 may be secured within the battery pack 24 at block 160. In an embodiment, the second tier structures 82 may be fastened to the platform 22 of the support bracket 90 using the mechanical fasteners 126.

Finally, at block 162, the cover 64 of the enclosure assembly 60 may be secured to the tray 62 in order to complete the assembly process of the battery pack 24. Once the cover 64 is secured to the tray 62, the battery arrays 25 and any second tier structures 82 are sealed inside the battery pack 24.

The exemplary battery packs of this disclosure incorporate assemblies for mounting and supporting battery arrays and other components within the battery pack. The unique design of the assembles enables the attachment of both arrays and support brackets that support second tier structures to a crossmember of each assembly. The assemblies further provide strategic weld access for constructing the assembly and for attaching the assembly to other components of the battery pack. This ensures additional weld bead radii are not introduced on the same plane as the array attachment locations, which could cause clearance issues between these components.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
a first battery array;
a second battery array adjacent the first battery array;
a crossmember positioned between the first battery array and the second battery array; and
a support bracket connected directly to the crossmember, wherein both the first battery array and the second battery array are secured to the crossmember,
wherein the support bracket includes a platform, a first anchoring arm that extends from the platform, and a second anchoring arm that extends from the platform, and further wherein the first anchoring arm extends through a first through-hole of an upper platform of the crossmember and the second anchoring arm extends through a second through-hole of the upper platform,
wherein the first anchoring arm is received in abutting contact with a first side of a stanchion of the crossmember and the second anchoring arm is received in abutting contact with a second side of the stanchion.

2. The battery pack as recited in claim 1, wherein a first flange of a first side plate of the first battery array is secured to the crossmember by a first mechanical fastener, and a second flange of a second side plate of the second battery array is secured to the crossmember by a second mechanical fastener.

3. The battery pack as recited in claim 2, wherein the first mechanical fastener and the second mechanical fastener are received through the first and second through-holes of the upper platform of the crossmember.

4. The battery pack as recited in claim 1, wherein the first and second anchoring arms are welded to the stanchion of the crossmember.

5. The battery pack as recited in claim 1, wherein the support bracket supports a second tier structure above the first battery array or the second battery array, and wherein the second tier structure is secured to the support bracket by a mechanical fastener.

6. The battery pack as recited in claim 5, wherein the mechanical fastener is received within a hole formed in the platform of the support bracket.

7. The battery pack as recited in claim 1, wherein the crossmember includes a base, the stanchion that extends upwardly from the base, and the upper platform disposed at an opposite end of the stanchion from the base.

8. The battery pack as recited in claim 7, wherein a first base portion of the base is attached to a first section of a tray of an enclosure assembly of the battery pack, and a second base portion of the base is attached to a second section of the tray.

9. The battery pack as recited in claim 7, comprising a hollow section formed in the base and the stanchion.

10. The battery pack as recited in claim 7, wherein the stanchion includes a first stanchion portion having a first thickness and a second stanchion portion having a second thickness that is smaller than the first thickness.

11. The battery pack as recited in claim 10, wherein the upper platform includes a third thickness that is greater than the first thickness.

12. The battery pack as recited in claim 7, wherein the upper platform includes a first platform portion that extends in a first direction laterally away from the stanchion and a second platform portion that extends in a second, opposite direction laterally away from the stanchion.

13. The battery pack as recited in claim 1, wherein the crossmember and the support bracket form an assembly, and the assembly further comprises an isolator mount attached to the crossmember.

14. The battery pack as recited in claim 13, wherein the isolator mount includes an elastomeric bushing.

15. The battery pack as recited in claim 7, wherein the crossmember and the support bracket are each disposed inside of an enclosure assembly of the battery pack.

16. The battery pack as recited in claim 1, wherein the platform includes a hole adapted for accommodating a mechanical fastener, and further comprising a second tier structure secured to the support bracket by the mechanical fastener.

17. A battery pack, comprising:
a first battery array;
a second battery array adjacent the first battery array;
a crossmember positioned between the first battery array and the second battery array,
wherein both the first battery array and the second battery array are secured to the crossmember;
a support bracket including a platform, a first anchoring arm that extends from the platform, and a second anchoring arm that extends from the platform, and further wherein the first anchoring arm extends through a first through-hole of an upper platform of the crossmember and the second anchoring arm extends through a second through-hole of the upper platform,
wherein the first anchoring arm is received in abutting contact with a first side of a stanchion of the crossmember and the second anchoring arm is received in abutting contact with a second side of the stanchion; and
a second tier structure supported above the first battery array or the second battery array by the support bracket, wherein the second tier structure is a third battery array, a battery electronics device, a control module, or a wiring.

\* \* \* \* \*